United States Patent Office 2,882,965
Patented Apr. 21, 1959

2,882,965

HIGH VISCOSITY, HIGH PERCENTAGE ALPHA CELLULOSE FROM SULFITE PULP

Morris Wayman, Daniel L. Sherk, and William A. Kraske, Prince Rupert, British Columbia, Canada, assignors to Columbia Cellulose Company, Limited, Prince Rupert, British Columbia, Canada, a corporation of British Columbia No Drawing. Application February 23, 1955
Serial No. 490,123

8 Claims. (Cl. 162—89)

This invention relates to the purification of wood pulp and relates more particularly to an improved process for the purification of wood pulp according to which there is obtained a product having an extremely high content of alpha cellulose with a minimum of degradation of the cellulose molecule.

Chemical cellulose, that is cellulose that is to be employed in chemical processes such as in the manufacture of cellulose derivatives and the production of regenerated cellulose articles, should have a high alpha cellulose content, yet the cellulose molecule should not be excessively degraded if satisfactory products are to be obtained. When the chemical cellulose is derived from wood pulp, it is necessary to purify the wood pulp in order to achieve the desired alpha cellulose level. If drastic conditions are employed during the purification of the wood pulp, the alpha cellulose level of the product will be high, but the cellulose molecules will be degraded excessively and the length of the cellulose chain will be too short. On the other hand, if mild conditions are employed in the purification of the wood pulp to avoid the degradation of the cellulose molecule, the alpha cellulose content of the product obtained will be inadequate. The achievement of a high alpha cellulose content by prior art processes is accordingly inconsistent with the production of a product in which the cellulose has a long chain.

It is an important object of this invention to provide a process for the purification of wood pulp which will be free from the foregoing and other difficulties.

A further object of this invention is to provide a process for the purification of wood pulp which will yield a product having a high alpha cellulose content with a minimum of degradation of the cellulose molecule.

Other objects of this invention will be apparent from the following detailed description and claims.

According to the present invention, it has been found that when wood pulp, such as sulfite pulp, is purified under carefully controlled conditions in a multi-stage process, one stage of which includes a high temperature caustic boil and a later stage of which includes a low temperature caustic extraction, there may be readily obtained a product of high alpha cellulose with a minimum degradation of the cellulose molecule. By means of this process, it is accordingly possible to produce a cellulose that will meet the most stringent requirements in the chemical field.

In carrying out the process of this invention, the wood pulp is treated in the first stage with either a chlorinating agent or an oxidizing agent, or both. Examples of such agents include chlorine, hypochlorites, chlorine dioxide, and mixtures of chlorine and chlorine dioxide. This treatment may be carried out in one or more steps, with a mild alkali wash of the pulp between successive steps, where a plurality of steps are employed. The conditions of treatment of the wood pulp during this first stage are not critical, good results having been obtained when the temperature ranges between about 0 and 30° C., the time of treatment ranges between about 5 and 60 minutes, the consistency of the pulp during the treatment ranges between about 2.5 and 4%, and the quantity of treating reagent is sufficient to supply between about 50 and 90% of the chlorine demand of the pulp. During this phase of the pulp treatment, there is removed from the pulp a large portion of the lignin contained therein. While it is preferred to begin the treatment of the pulp with a chlorinating or oxidizing agent, this stage of the treatment may be omitted entirely and the removal of the lignin remaining after cooking effected during the subsequent stages of the process.

Following the first stage treatment, the pulp is subjected to a high temperature caustic boil under carefully controlled conditions. During the high temperature boil, good results are obtained when the concentration of the caustic soda ranges from a minimum of about 1% by weight to a maximum of about 13% by weight, both based on the weight of the pulp, the temperature ranges from about 90 to 170° C., the concentration of the pulp slurry ranges between about 5 and 20% by weight, and the time of treatment ranges between about 8 and 240 minutes, with the longer times of treatment being needed at the lower temperatures and higher caustic concentrations. At higher temperatures in this range, namely, between about 140° C. and the maximum specified above, it is desirable to keep the time of treatment at less than about 15 minutes, since with a treatment of longer duration at these high temperatures there is a tendency for the pulp to develop an undesirable color, particularly if the pulp being treated contains lignin.

While the conditions specified above for the high temperature boil give good results, it has been found that a product having a significanttly higher alpha cellulose content may be obtained if the conditions of treatment during the high temperature boil are held within a much narrower range. For these optimum results, the concentration of caustic soda ranges from a minimum of about 5% by weight to a maximum of about 13% by weight, both based on the weight of the pulp, the temperature ranges between about 120 and 145° C., the concentration of the pulp slurry ranges between about 6 and 20% by weight, and the time of treatment ranges between about 15 and 60 minutes.

In accordance with this invention, the pulp which has been subjected to a high temperature boil as one stage in its treatment, is subjected at a later stage of its treatment to a cold caustic extraction. During this extraction, the concentration of caustic soda ranges between about 40 and 220 grams per liter, the temperature ranges between about 5 and 50° C., the concentration of the pulp slurry ranges between about 2 and 18% by weight, and the time of treatment ranges between about 5 and 120 minutes. While a good pulp may be readily obtained at any point within this range of conditions, it has been found that even better results, with respect to the alpha cellulose level of the final product, are achieved when the conditions during the cold caustic extraction are held within a narrower range. For these optimum results, the concentration of caustic soda ranges between about 100 and 140 grams per liter, the temperature ranges between about 10 and 25° C., the concentration of the pulp slurry ranges between about 2 and 6% by weight, and the time of treatment ranges between about 15 and 60 minutes. When the optimum conditions are employed during the cold caustic extraction and other than the optimum conditions are employed during the high temperature boil, it is possible to obtain a pulp having an alpha cellulose content of above 98%. When the optimum conditions are employed both during the cold caustic extraction and during the high temperature boil, it is possible to obtain a pulp having an alpha cellulose content above 99%. Despite their extremely high alpha cellulose contents, the cellulose in these wood pulps has a viscosity of above about 125 centipoises when measured at 20° C. as a 1% by weight solution in cupriethylene diamine. All the viscosities given herein are measured under the same conditions. This combination of properties in a wood pulp cellulose is unique.

Surprisingly, if the temperature employed during the cold caustic extraction is lowered so that it lies outside the range specified above, the alpha cellulose content of the pulp decreases. Similarly, if the concentration of caustic is raised above that specified above, the alpha cellulose content of the pulp also decreases. This is contrary to normal expectations arising from experience with prior processes in which pulp has been treated with caustic at relatively low temperatures. The discovery of this particular set of conditions, accordingly, represents a definite break with the teachings of the art.

The wood pulp is also bleached to improve its color and that of the products prepared therefrom. During the cold caustic extraction, particularly when the caustic concentration is above about 80 grams per liter, if the pulp is exposed to the oxygen in the air, the cellulose molecules will be oxidized to some extent. Such oxidized pulp will be quite sensitive to the action of certain bleaching agents as hypochlorites and chlorine, so that treatment of the pulp with said bleaching agents will tend to shorten the length of the cellulose molecules which may be undesirable for certain uses of the pulp. To avoid this shortening in the length of the cellulose molecules, the cold caustic extraction may be carried out in an oxygen-free atmosphere, such as an atmosphere of nitrogen, natural gas and the like. Also, if desired, the bleaching of the pulp may precede the cold caustic extraction in which case no special care need be taken during the bleaching step. It is preferred, however, to carry out the bleaching of the pulp after the cold caustic extraction with a bleaching agent of the type that has substantially no degrading action on the cellulose molecule. Examples of such bleaching agents are chlorine dioxide and chlorites. The precise conditions of bleaching are not critical and may be varied in accordance with the quality of the pulp being treated and the results it is desired to obtain, all as well known in the art.

The following examples are given to illustrate this invention further.

*Example I*

A raw unbleached sulfite pulp is chlorinated with a 0.09% by weight solution of chlorine at a consistency of 3% by weight for 30 minutes at a temperature of 20° C. This represents chlorination to 75% of the chlorine demand of the pulp. The chlorinated pulp is subjected to a high temperature alkali boil at 140° C. for 18 minutes with a concentration of sodium hydroxide of 6% by weight on the weight of the pulp and at a consistency of 6% by weight. The pulp is then extracted for 30 minutes with a solution containing 94 grams sodium hydroxide per liter of the solution at a temperature of 25° C. and a consistency of 3% by weight. The treated pulp is bleached for 45 minutes at 45° C. with 0.5% available chlorine as chlorine dioxide at a consistency of 5% by weight. Finally, the pulp is sheeted and dried, all in a manner known in the art. The pulp has an alpha cellulose content of 97.5% and a viscosity of 155 centipoises when measured as above.

*Example II*

A raw unbleached sulphite pulp is chlorinated and hot extracted as in the previous example. The pulp is then extracted for 30 minutes with a solution containing 120 grams sodium hydroxide per liter of the solution at a temperature of 15° C. The pulp has an alpha cellulose content of 99.4% and a viscosity of 160 centipoises when measured as above.

It is to be understood that the foregoing detailed description is merely given by way of illustration and that many variations may be made therein without departing from the spirit of our invention.

Having described our invention, what we desire to secure by Letters Patent is:

1. A multi-stage process for the purification of sulfite pulp which comprises slurrying the pulp with a first caustic soda solution having a caustic concentration of between about 1 and 13% by weight based on the weight of the pulp, at a temperature between about 90 and 170° C. and at a consistency of between about 5 and 20% by weight for a period of between about 8 and 240 minutes, and, as the next immediate chemical treatment of the pulp, slurrying the pulp with a second caustic soda solution having a caustic concentration of between about 40 and 220 grams per liter, at a temperature of between about 5 and 50° C., and at a consistency of between about 2 and 18% by weight, for a period of between about 5 and 120 minutes.

2. The process set forth in claim 1, wherein prior to treatment with said first caustic soda solution said pulp is slurried with chlorine, and wherein following treatment with said second caustic soda solution said pulp is bleached with chlorine dioxide.

3. The process set forth in claim 1, including the further step of bleaching the pulp with a member of the group consisting of chlorine dioxide and chlorites.

4. The process set forth in claim 3, wherein prior to treatment with said first caustic soda solution said pulp is slurried with a member of the group consisting of chlorine, hypochlorites, chlorine dioxide and mixtures of chlorine and chlorine dioxide.

5. The process set forth in claim 1, wherein the second caustic soda solution has a caustic concentration of between about 100 and 140 grams per liter, and the treatment of the pulp with said second caustic soda solution is carried out at a temperature of between about 10 and 25° C., and at a pulp consistency of between about 2 and 6% by weight, for a period of between about 15 and 60 minutes.

6. The process set forth in claim 5, wherein the first caustic soda solution has a caustic concentration of between about 5 and 13% by weight based on the weight of the pulp and the treatment of the pulp with said first caustic soda solution is carried out at a temperature of between about 120 and 145° C., and at a consistency of between about 6 and 20% by weight for a period of between about 15 and 60 minutes.

7. The process set forth in claim 6, including the further step of bleaching the pulp with a member of the group consisting of chlorine dioxide and chlorites.

8. The process set forth in claim 7, wherein prior to treatment with said first caustic soda solution said pulp is slurried with a member of the group consisting of chlorine, hypochlorites, chlorine dioxide and mixtures of chlorine and chlorine dioxide.

References Cited in the file of this patent

UNITED STATES PATENTS

| | | |
|---|---|---|
| 1,741,540 | Richter | Dec. 31, 1929 |
| 2,185,776 | Sheldon et al. | Jan. 2, 1940 |
| 2,249,174 | Richter | July 15, 1941 |
| 2,408,849 | Haney et al. | Oct. 8, 1946 |
| 2,513,788 | Day et al. | July 4, 1950 |
| 2,558,054 | Martin et al. | June 26, 1951 |